March 13, 1962   C. DEPREZ   3,025,332
PROCESS OF HALOGENATION
Filed Dec. 30, 1958
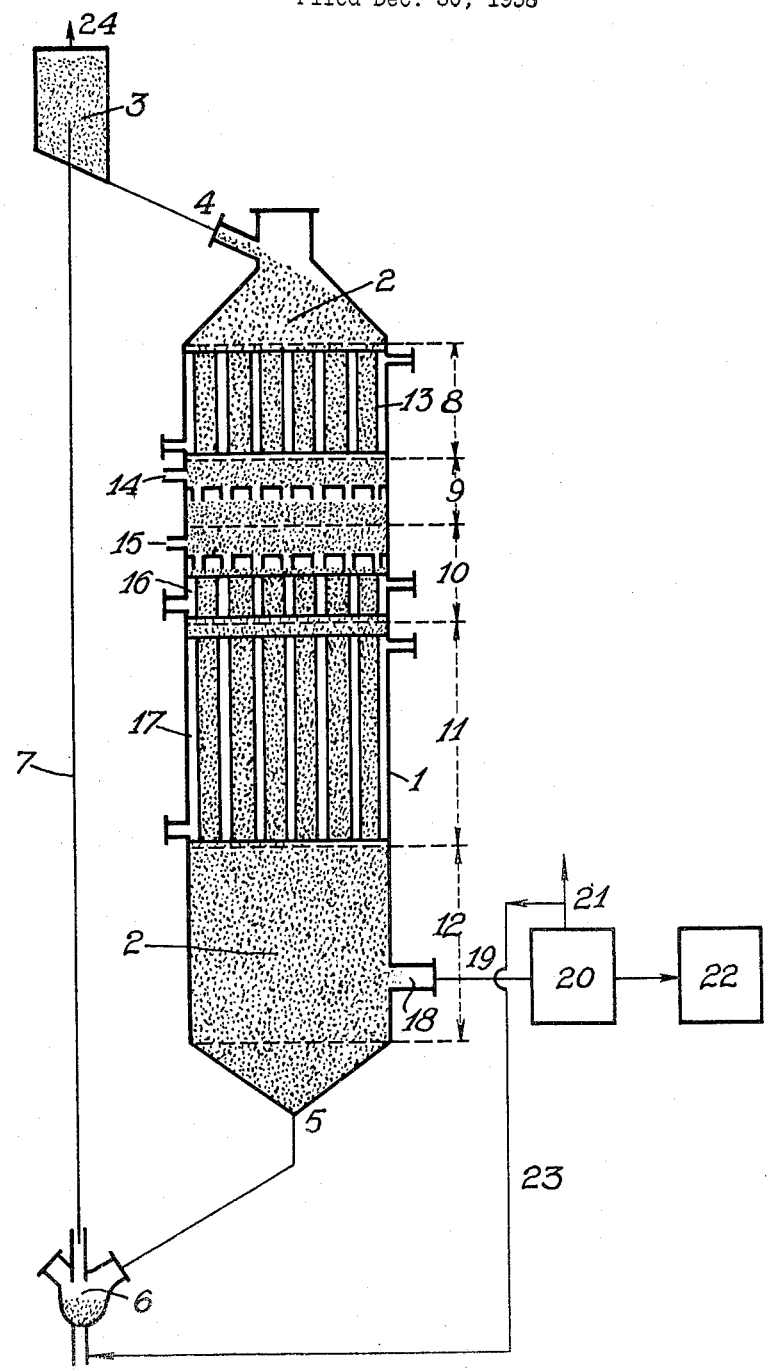

United States Patent Office 3,025,332
Patented Mar. 13, 1962

3,025,332
PROCESS OF HALOGENATION
Charles Deprez, Uccle-Brussels, Belgium, assignor to Solvay & Cie., Brussels, Belgium, a Belgian company
Filed Dec. 30, 1958, Ser. No. 783,972
Claims priority, application France Jan. 6, 1958
6 Claims. (Cl. 260—654)

The present invention concerns a process of halogenating hydrocarbons, particularly a process for the chlorination of acetylene by means of gaseous chlorine in the presence of an adsorbing material and, if desired, of catalysts without any risk of explosion.

Another object of the invention is a process for the continuous production in a single step of trichlorethylene by pyrolysis of tetrachlorethane obtained by chlorinating acetylene by means of gaseous chlorine in the presence of an adsorbing material and, if desired, of catalysts, chlorine and acetylene being used in sensibly stoichiometric quantities according to the reactions

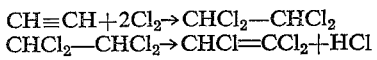

without it being necessary to separate the tetrachlorethane, in order to subject the same to pyrolysis in a separate device.

Another object of the invention is a process for the continuous production in a single step of tetrachlorethylene by chlorinating pyrolysis of tetrachlorethane obtained by chlorinating acetylene by means of gaseous chlorine in the presence of an adsorbing material and, if desired, of catalysts, chlorine and acetylene being used in sensibly stoichiometric quantities according to the reactions:

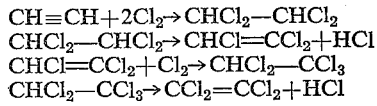

without it being necessary to separate the tetrachlorethane, in order to subject it to chlorinating pyrolysis in a separate device.

Another object of the invention is a process for the production of tri- and/or tetrachlorethylene with the exclusion of substantial amounts of any other product, by pyrolysis and/or chlorinating pyrolysis of tetrachlorethane obtained by chlorinating acetylene by means of gaseous chlorine in the presence of an adsorbing material and, if desired, of catalysts, without it being necessary to separate the tetrachlorethane, in order to subject it to pyrolysis and/or chlorinating pyrolysis in a separate device.

Up to the present, the industrial manufacture of tri- and tetrachlorethylene from acetylene has consisted in producing tetrachlorethane which is separated from the reaction medium and subjected to pyrolysis or chlorinating pyrolysis, in order to obtain tri- and tetrachlorethylene, respectively. The tetrachlorethane is obtained by chlorination of acetylene, but since this reaction involves the risk of explosion, it is expedient to effect the reaction of chlorine or acetylene in a solvent such as tetrachlorethane.

However, it has already been proposed to chlorinate acetylene, in order to obtain tetrachlorethylene without the intermediate separation of the tetrachlorethane formed. For this purpose, it has been suggested to mix chlorine and acetylene in volumetric proportions comprised between 6:1 and 10:1 in a vessel filled with sand. If the transit speed of the gaseous mixture in the vessel is high, no reaction occurs; but if at the outlet of this vessel, the gaseous mixture is caused to enter a very wide zone so that its transit speed is strongly diminished, and if this zone is subjected to a temperature of 400 to 600° C., the reaction product comprises a major portion of tetrachlorethylene, whilst, if the zone is kept at a temperature of 200 to 400° C., no tetrachlorethylene is formed.

The disadvantage of this process is that it necessitates an enormous excess of chlorine which may corresponed to more than three times the stoichiometric quantity required for obtaining tetrachlorethylene and, on account of the elevated temperature in the reaction zone, the vessel must be made of special resistant and expensive material.

It has moreover been proposed to effect the manufacture of tetrachlorethylene by chlorination of acetylene in a fixed bed of active carbon or silica gel kept at 300–400° C. If in this case the mixtures of chlorine and acetylene are used in a volumetric proportion of 3:1, it is necessary to introduce simultaneously into the fixed bed 10 parts by volume of a diluting gas per part by volume of gaseous reaction mixture, in order to carry away the heat released.

The disadvantage of this process is that it necessitates the use of a considerable quantity of diluting gas, the various regulations of operation and the maintaining of temperature thus being made very difficult.

The applicant has found that it is possible to halogenate hydrocarbons and particularly to chlorinate acetylene by means of gaseous chlorine without any risk of explosion, and to produce tri- and/or tetrachlorethylene by pyrolysis and/or chlorinating pyrolysis of this tetrachlorethane without it being necessary to separate the latter from the reaction medium prior to subjecting it to pyrolysis and/or chlorinating pyrolysis, by a process exhibiting none of the disadvantages of the methods mentioned above.

This process which is the object of the invention is characterized in that the halogenation of hydrocarbons and particularly the chlorination of acetylene by means of gaseous chlorine is carried out in a moving bed of adsorbing material and, if desired, of catalysts.

The applicant has found the surprising fact that by the introduction of chlorine and acetylene in sensibly stoichiometric quantities into a moving bed of adsorbing material and, if desired, in the presence of catalysts, the reaction of chlorination sets in immediately without the occurrence of any explosion. The applicant has also found that it is possible to effect in the same moving bed the pyrolysis and/or chlorinating pyrolysis of tetrachlorethane without having to separate the latter from the moving bed, and thus to obtain tri- and/or tetrachlorethylene in elevated yields. Since secondary chlorinated products may be formed during pyrolysis, it is necessary to introduce an amount of chlorine corresponding to the formation of these products; however, by recycling the secondary products it is possible to use a sensibly stoichiometric amount of chlorine.

The advantages of such a process are important. On account of the heat generated by the adsorption of the chlorine on the adsorbing matter and of the heat generated by the chlorination of acetylene, no special heating device is required for attaining and maintaining the temperature in the zone of pyrolysis, for the heat released by the adsorption of chlorine and by the chlorination of acetylene is carried by the moving bed to the point where they are used for pyrolysis and/or chlorinating pyrolysis of the tetrachlorethane formed. Moreover, it has been found that, when the temperature in the zone of pyrolysis reaches 300 to 350° C., excellent yields in chlorinated olefinic hydrocarbons are obtained; due to the fact that the amount of heat is regularly distributed along the cross section of the moving bed, that is to say that substantially no gradient of temperature exists along this section as is the case with hitherto known processes where the reaction zones are externally heated, and since, moreover, the total or at least the major part of the heat is transmitted by the interior of the reactor, the problems arising from corrosion of material disappear completely.

As adsorbing material there is preferably selected active carbon. Wood charcoal, animal charcoal, gels of silica or of alumina may also be used.

If desired, the operation may be carried out in the presence of known catalysts which promote the reactions of chlorination and dehydrochlorination, for example of metal chlorides such as chlorides of barium, zinc, manganese, nickel, cobalt, copper, iron, bismuth, etc.

It has been observed that by working in the presence of these catalysts, good yields in chlorinated olefinic hydrocarbons are already obtained when the temperature in the zone of pyrolysis of tetrachlorethane is of the order of 250 to 300° C.

Without wanting to put forward a theory concerning this process of chlorinating acetylene, the applicant assumes that the adsorbing matter charged with chlorine may be considered as a solution of this gas in the adsorbent at the surface of which the chlorination reaction proceeds.

It is evident, that, dependent on the relative quantities of chlorine and acetylene employed, there will be chiefly obtained trichlorethylene (molecular ratio $Cl_2:C_2H_2=2:1$), tetrachlorethylene (molecular ratio $Cl_2:C_2H_2=3:1$), or a mixture of both (molecular ratio $Cl_2:C_2H_2$ comprised between 2:1 and 3:1).

The great advantage of the process is that it may be carried out continuously, the moving bed being recycled to the top of the apparatus. In this case, the reaction is started by introducing a quantity of chlorine which is very slightly superior to the quantity of chlorine contained in the outgoing products, this small excess corresponding to the amount of chlorinated products which at the given reaction temperature remain adsorbed on the particles of the moving bed. But after a short time, there is only introduced strictly the quantity of chlorine corresponding to the quantity of chlorine contained in the desired products.

The adsorbing matter may be recycled by mechanical means or, preferably, by an ascending gas stream. In this latter case, it is advantageous to use a portion of the hydrogen chloride formed during the reactions as a fluid driving means.

The invention will now be explained in detail with reference to the single figure of the accompanying drawing and to the following examples which are given for the purpose of illustration. It must be understood that they do not in any way limit the scope of the invention which is capable of numerous variations without leaving its spirit.

The figure shows very schematically the device for carrying out the process according to the invention.

In the reactor 1 a moving bed 2 of adsorbing matter, for example active carbon which flows down from a batch reservoir 3 and enters the reactor 1 at 4, circulates from the top to the bottom. The adsorbing matter leaves the reactor at 5 and is brought back into the tank 3 by means of the blower 6 and the pipe 7.

In order to follow the details of the process more easily, the following zones of the reactor are considered from top to bottom respectively: a cooling zone 8, an adsorption zone 9, a chlorination zone 10, a pyrolysis zone 11 and a zone 12 from where the final products are evacuated and where the adsorbing matter is again in the same chemical state as when entering the reactor, that is to say that the reaction products have been evacuated, but a small quantity of chlorinated products remains adsorbed and circulates into and from the reactor. These products correspond to the small quantity of chlorine which has been introduced in excess at the start of the operation.

In the cooling zone 8 there is a cooling device 13 the object of which is to lower the temperature of the adsorbing matter, in order to promote the adsorption of chlorine.

In the adsorption zone 9 there is a supply tube 14 for the chlorine, whilst the supply tube 15 for the acetylene is arranged in the zone 10 which is moreover fitted with a device 16 for regulating the temperature which, if desired, is used to supply heat for starting the reaction of chlorination at the beginning of the operation. In the zone of pyrolysis 11 there is provided a device 17 for regulating the temperature which operates automatically in relation to the temperature to be maintained in this zone.

The zone 12 is fitted with an outlet tube 18 for evacuating the final products which flow through the pipe 19 into the cooler 20 where the products are condensed and where the hydrogen chloride is collected at 21, whilst the liquid products are collected after rectification at 22. A portion of hydrogen chloride may be brought through the piping 23 to the blower 6. This hydrogen chloride is used for re-cycling the adsorbent, evacuated at 24 and recovered.

The chlorine is introduced at 14, very rapidly adsorbed by the active carbon and flows to the lower zones in the state of adsorption on the active carbon.

The acetylene is introduced at 15, meets the descendent stream of active carbon charged with adsorbed chlorine, and chlorination sets in immediately at the surface of the adsorbing material. The chlorine and acetylene are introduced in proportions depending on the desired products.

The device 16 for regulating the temperature serves only for starting the cycle of operations; when the reaction has started, the addition of heat is no longer necessary.

In order to facilitate the explanation, the zone of chlorination is shown in the diagram as extending over a fairly large distance. Actually, this zone may be extremely small and almost coinciding with the zone of pyrolysis, for on account of the heat generated by the adsorption of the chlorine on the adsorbing material and of the heat generated by the chlorination of acetylene, the pyrolysis of tetrachlorethane may set in almost instantaneously. Pyrolysis is carried out in the zone 11 and the device 17 for regulating the temperature is intended for supplying cooling, if necessary. The temperature in this zone is determined according to operating conditions and to the desired products. It has been found, for example, that in the presence of active carbon a temperature of 300 to 350° C. in this zone leads to excellent yields in tri- or tetrachlorethylene. On the other hand, when operating in the presence of known catalysts such as chlorides of barium, cobalt, nickel, copper, iron, manganese, zinc or bismuth, a temperature of 250 to 300° C. is sufficient for obtaining a good yield in tri- and tetrachlorethylene.

The products formed in the zone of pyrolysis follow the movement of the moving bed and cannot re-ascend towards the upper zones, precisely on account of the movement of the moving bed and of the introduction of chlorine and acetylene into the upper zones. The final products are evacuated via the tube 18 and flow through the cooler 20 where they are condensed with the exception of hydrogen chloride which is thus separated and recovered. The condensed products are then rectified. The adsorbing material freed from the final products has a temperature somewhat below that prevailing in the zone of pyrolysis. It is still charged with a small quantity of chlorinated products which can only be desorbed at a more elevated temperature. However, since the material circulates in a closed circuit, it is sufficient to introduce, at the start of the operations, a quantity of chlorine corresponding to the formation of these products which remain adsorbed on the material of the moving bed.

The temperature in the zone of pyrolysis is regulated as has been mentioned above, by the device 17 for the regulation of temperature. It may also be regulated by the action of the devices for temperature regulation 17 and 13, the latter bringing the adsorbing material to a temperature which promotes the adsorption of chlorine.

The speed of movement of the moving bed of adsorbent material is, of course, determined by the characteristics of the adsorption of chlorine on the porous material.

The advantages of the process are clearly evident: it is continuous and necessitates only a device of minimum size compared with the devices hitherto employed. No means of external heating are required for attaining and maintaining the temperatures necessary for carrying out the process. Since these temperatures are regularly distributed all over the moving bed, there is no temperature gradient along the cross-section of the reactor and, furthermore, since the total or at least the major part of the heat required for the reaction is generated and transmitted in the interior of the reactor, no further problems of corrosion of material arise as has been the case with all the processes hitherto used where the reaction chambers are heated externally. Moreover, the yield in chlorine is practically 100% and it is not necessary to dilute the reagents with chlorine or an inert gas, the operations inherent in the separation of the final products thus being considerably simplified.

Moreover, the chlorinated products recovered during rectification of the final products may be recycled, in order to be cracked in the zone of pyrolysis. In this case, it is advantageous to volatilize the heavy products before recycling them to the zone of pyrolysis. If, on the other hand, the exclusive production of tetrachlorethylene is desired, it is possible to recycle, in addition to the secondary chlorinated products, the trichlorethylene formed in small quantities.

The following examples illustrate the efficiency of the process which is the object of the present invention. It has been noticed that by applying the said process, chlorine or acetylene are no longer detected in the final products and this implies a rate of conversion of chlorine and acetylene of 100%.

*Example 1*

The adsorbing material used is active carbon (Norit RL II). Chlorine and acetylene are introduced in a molecular ratio of 3.17:1. The temperatures maintained in the various zones are: zone of adsorption: 170° C.; zone of chlorination: 280° C.; zone of pyrolysis: 286° C.; zone of elimination of the final products: 284° C. The chlorination reaction of acetylene proceeds without any explosion, and tetrachlorethylene is recovered in a yield of 73 percent by molecule, trichlorethylene in a yield of 5% by molecule, and the remaining 22% by molecule consist of secondary halogenated products, particularly hexachlorethane.

*Example 2*

The process is carried out similarly to the preceding example, except for the temperatures. In the zone of adsorption the temperature is 180° C., in the zone of chlorination 300° C., in the zone of pyrolysis 350° C. and in the bottom zone 325° C. In this case, tetrachlorethylene is obtained in a yield of 82% by molecule for a molar ratio $Cl_2:C_2H_2$ of 3.07:1. Moreover there is obtained trichlorethylene in a yield of 5.5% by molecule and residual chlorinated products in a yield of 12.5% by molecule. These residual products consist chiefly of hexachlorethane. By recycling the heads and the tails of the rectification of tetrachlorethylene, it is possible to reduce the ratio $Cl_2:C_2H_2$ to a value 3 and there is obtained a molecular yield in tetrachlorethylene of 98–99%.

*Example 3*

The process is carried out with a moving bed of active carbon and in the presence of barium chloride as catalyst. The latter is impregnated on the support in a proportion of 10% by weight of active carbon (Norit RL II). The temperatures in the zones of adsorption, chlorination, pyrolysis and elimination of the final products are 180, 270, 300 and 285° C. respectively. Chlorine and acetylene are injected in a proportion of 3 parts by volume of chlorine for one part of acetylene. The yields obtained are: tetrachlorethylene: 76% by molecule; trichlorethylene: 12% by molecule, and secondary chlorinated products: 12% by molecule.

*Example 4*

The process is carried out with the same moving bed as in Example 3, maintaining the same temperatures in the various zones, but using smaller quantities of chlorine, the molecular ratio chlorine:acetylene being 2.62:1. The yields obtained are: tetrachlorethylene: 50% by molecule; trichlorethylene: 44% by molecule, and secondary chlorinated products: 6% by molecule.

*Example 5*

The moving bed is constituted by active carbon and the process is carried out in the presence of cobalt chloride, the latter in a quantity comprised between 5 and 7% by weight, referred to active carbon (Norit RL II). The operations are effected with quantities of chlorine and acetylene in a molar proportion of 3:1. The temperature in the zone of pyrolysis is 300° C., and the following yields are obtained: tetrachlorethylene: 82% by molecule, trichlorethylene: 9% by molecule, and secondary chlorinated products: 9% by molecule. By operating with a molar proportion $Cl_2:C_2H_2$ of 2.62:1 and maintaining the temperature in the zone of pyrolysis at 350° C. tetrachlorethylene is obtained in a yield of 51% by molecule, trichlorethylene in a yield of 40% by molecule and residual chlorinated products in a quantity of 9% by molecule.

*Example 6*

The catalyst is nickel chloride in a proportion of 9 g. per 100 g. of active carbon. With a volumetric ratio chlorine:acetylene of 3:1, and by maintaining a temperature of 300° C. in the zone of pyrolysis, there is observed a formation of tetrachlorethylene of 73% by molecule, of trichlorethylene of 19% by molecule and of secondary chlorinated products of 8% by molecule.

When working under the same conditions with a volumetric ratio of chlorine and acetylene of 2.73:1, there is found a formation of tetrachlorethylene of 51% by molecule, trichlorethylene of 38% by molecule and of secondary chlorinated products of 11% by molecule.

If the process is carried out in the presence of manganese chloride or zinc chloride, similar results are obtained.

If a complete conversion of the acetylene into a mixture of tetrachlorethylene and trichlorethylene in a molar proportion of approximately 3:2 is desired, the secondary chlorinated products are recycled and a molar ratio $Cl_2:C_2H_2$ of 2.6 is maintained.

I claim:

1. A process for the preparation by addition chlorination of chlorinated olefinic hydrocarbons selected from the group consisting of tri-chloroethylene and tetra-chloroethylene which comprises providing a movable non-fluidized bed of an adsorbent which has been impregnated with a catalyst favorably effecting the rate of reaction between chlorine and acetylene, said movable bed comprising from the top to the bottom, a cooling zone for the adsorbent, an adsorption zone, a reaction zone, a pyrolysis zone maintained at a temperature of about 250 to 350° C., and a separation zone for separating the formed products from the moving bed, feeding gaseous chlorine at the top of the absorption zone, feeding acetylene at the top of the reaction zone, wherein the two gases are interacted in a chlorine to acetylene molecular ratio of 2:1 to 3:1 to produce tetra-chloroethane, submitting said tetrachloroethane to pyrolysis in the pyrolysis zone, separating the produced mixture of chlorinated compounds and hydrogen chloride from the movable bed in the separation zone, rectifying said mixture of chlorinated products to separate said product selected from the group consisting of tri-chloroethylene and tetra-chloroethylene in a pure state from the remainder of said mixture, recycling into the pyrolysis zone the remainder of said mixture for cracking the same into chlorinated olefinic hydrocarbons selected from the group consisting of tri-chloroethylene and tetra-chloroethylene, and recycling the adsorbent into the cooling zone by means of an ascending stream of hydrogen chloride.

2. A process for the preparation by addition chlorination of chlorinated olefinic hydrocarbons selected from the group consisting of tri-chloroethylene and tetra-chloroethylene which comprises providing a movable non-fluidized bed of adsorbing material selected from the group consisting of active carbon, wood charcoal, animal charcoal, silica gel and alumina gel which has been impregnated with a metal chloride catalyst, said movable bed comprising from the top to the bottom, a cooling zone for the adsorbent, an adsorption zone, a reaction zone, a pyrolysis zone maintained at a temperature of about 250 to 350° C., and a separation zone for separating the formed products from the moving bed, feeding gaseous chlorine at the top of the adsorption zone, feeding acetylene at the top of the reaction zone, wherein the two gases are interacted in a chlorine to acetylene molecular ratio of 2:1 to 3:1 to produce tetra-chloroethane, submitting said tetra-chloroethane to pyrolysis in the pyrolysis zone, separating the produced mixture of chlorinated compounds and hydrogen chloride from the movable bed in the separation zone, rectifying said mixture of chlorinated products to separate said product selected from the group consisting of tri-chloroethylene and tetra-chloroethylene in a pure state from the remainder of said mixture, recycling into the pyrolysis zone the remainder of said mixture for cracking the same into chlorinated olefinic hydrocarbons selected from the group consisting of tri-chloroethylene and tetra-chloroethylene, and recycling the adsorbent into the cooling zone by means of an ascending stream of hydrogen chloride.

3. A process for the preparation by addition chlorination of tri-chloroethylene which comprises providing a movable non-fluidized bed of an adsorbent which has been impregnated with a catalyst favorably effecting the rate of reaction between chlorine and acetylene, said movable bed comprising from the top to the bottom, a cooling zone for the adsorbent, an adsorption zone, a reaction zone maintained at a temperature of about 250 to 350° C., a pyrolysis zone, and a separation zone for separating the formed products from the moving bed, feeding gaseous chlorine at the top of the adsorption zone, feeding acetylene to the top of the reaction zone, wherein the two gases are interacted in a chlorine to acetylene molecular ratio of substantially 2 to produce tetra-chloroethane, submitting said tetra-chloroethane to pyrolysis in the pyrolysis zone, separating the produced mixture of chlorinated compounds and hydrogen chloride from the movable bed in the separation zone, rectifying said mixture of chlorinated products to separate tri-chloroethylene in a pure state from the remainder of said mixture, recycling into the pyrolysis zone the remainder of said mixture for cracking the same into tri-chloroethylene, and recycling the adsorbent into the cooling zone by means of an ascending stream of hydrogen chloride.

4. A process for the preparation by addition chlorination of tri-chloroethylene which comprises providing a movable non-fluidized bed of adsorbent selected from the group consisting of active carbon, wood charcoal, animal charcoal, silica gel and alumina gel which has been impregnated with a metal chloride catalyst, said movable bed comprising from the top to the bottom, a cooling zone for the adsorbent, an adsorption zone, a reaction zone, a pyrolysis zone maintained at a temperature of about 250 to 350° C., and a separation zone for separating the formed products from the moving bed, feeding gaseous chlorine at the top of the adsorption zone, feeding acetylene to the top of the reaction zone, wherein the two gases are interacted in a chlorine to acetylene molecular ratio of substantially 2 to produce tetra-chloroethane, submitting said tetra-chloroethane to pyrolysis in the pyrolysis zone, separating the produced mixture of chlorinated compounds and hydrogen chloride from the movable bed in the sepaartion zone, rectifying said mixture of chlorinated products to separate tri-chloroethylene in a pure state from the remainder of said mixture, recycling into the pyrolysis zone the remainder of said mixture for cracking the same into tri-chloroethylene, and recycling the adsorbent into the cooling zone by means of an ascending stream of hydrogen chloride.

5. A process for the preparation by addition chlorination of tetra-chloroethylene which comprises providing a movable non-fluidized bed of an adsorbent which has been impregnated with a catalyst favorably effecting the rate of reaction between chlorine and acetylene, said movable bed comprising from the top to the bottom, a cooling zone for the adsorbent, an adsorption zone, a reaction zone, a pyrolysis zone maintained at a temperature of about 250 to 350° C., and a separation zone for separating the formed products from the moving bed, feeding gaseous chlorine at the top of the adsorption zone, feeding acetylene to the top of the reaction zone, wherein the two gases are interacted in a chlorine to acetylene molecular ratio of substantially 3 to produce tetra-chloroethane, submitting said tetra-chloroethane to pyrolysis in the pyrolysis zone, separating the produced mixture of chlorinated compounds and hydrogen chloride from the movable bed in the separating zone, rectifying said mixture of chlorinated products to separate tetra-chloroethylene in a pure state from the remainder of said mixture, recycling itno the pyrolysis zone the remainder of said mixture for cracking the same into tetra-chloroethylene, and recycling the adsorbent into the cooling zone by means of an ascending stream of hydrogen chloride.

6. A process for the preparation by addition chlorination of tetra-chloroethylene which comprises providing a movable non-fluidized bed of adsorbent selected from the group consisting of active carbon, wood charcoal, animal charcoal, silica gel and alumina gel which has been impregnated with a metal chloride catalyst, said movable bed comprising from the top to the bottom, a cooling zone for the adsorbent, an adsorption zone, a reaction zone, a pyrolysis zone maintained at a temperature of about 250 to 350° C., and a separation zone for separating the formed products from the moving bed, feeding gaseous chlorine at the top of the adsorption zone, feeding acetylene to the top of the reaction zone, wherein the two gases are interacted in a chlorine to acetylene molecular ratio of substantially 3 to produce tetra-chloroethane, submitting said tetra-chloroethane to pyrolysis in the pyrolysis zone, separating the produced mixture of chlorinated compounds and hydrogen chloride from the movable bed in the separating zone, rectifying said mixture of chlorinated products to separate tetra-chloroethylene in a pure state from the remainder of said mixture, recycling into the pyrolysis zone the remainder of said mixture for cracking the same into tetra-chloroethylene, and recycling the adsorbent into the cooling zone by means of an ascending stream of hydrogen chloride.

References Cited in the file of this patent

UNITED STATES PATENTS

| 2,222,931 | Basel et al. | Nov. 26, 1940 |
| 2,255,752 | Basel et al. | Sept. 16, 1941 |
| 2,756,127 | James et al. | July 24, 1956 |
| 2,756,247 | James et al. | July 24, 1956 |

FOREIGN PATENTS

| 673,565 | Great Britain | June 11, 1952 |